United States Patent [19]

Woodhead

[11] Patent Number: 4,606,847

[45] Date of Patent: Aug. 19, 1986

[54] PROCESS FOR THE PREPARATION OF A DISPERSABLE PRODUCT CONTAINING A CERIUM COMPOUND IN ASSOCIATION WITH A SELECTED METAL

[75] Inventor: James L. Woodhead, Didcot, England

[73] Assignee: United Kingdom Atomic Energy Authority, England

[21] Appl. No.: 791,149

[22] Filed: Oct. 24, 1985

Related U.S. Application Data

[63] Continuation of Ser. No. 589,743, Mar. 15, 1984, abandoned, which is a continuation of Ser. No. 402,248, Jul. 27, 1982, abandoned.

[30] Foreign Application Priority Data

Aug. 7, 1981 [GB] United Kingdom ............... 8124245

[51] Int. Cl.$^4$ .............................................. B01J 13/00
[52] U.S. Cl. .............................. 252/363.5; 252/313.1; 423/263
[58] Field of Search ............. 252/313.1, 315.01, 363.5; 423/263

[56] References Cited

U.S. PATENT DOCUMENTS

| | | | |
|---|---|---|---|
| 3,024,199 | 3/1962 | Pasfield | 252/313.1 |
| 3,761,571 | 9/1973 | Woodhead | 423/263 |
| 4,049,463 | 9/1977 | Hafner | 423/263 |
| 4,181,532 | 1/1980 | Woodhead | 252/313.1 |
| 4,231,893 | 11/1980 | Woodhead | 423/263 |
| 4,356,106 | 10/1982 | Woodhead et al. | 423/263 |

FOREIGN PATENT DOCUMENTS 1342893 1/1974 United Kingdom .
1603794 11/1981 United Kingdom .

*Primary Examiner*—John F. Terapane
*Assistant Examiner*—Anne Brookes
*Attorney, Agent, or Firm*—Larson and Taylor

[57] ABSTRACT

The present invention relates to compounds and more particularly to cerium compounds and cerium compounds in association with other elements.

The invention provides a process for the preparation of a dispersible product containing a cerium compound which comprises heating a cerium (IV) oxide hydrate in the presence of a salt to cause deaggregation of aggregated crystallites in the cerium (IV) oxide hydrate and produce a dispersible product containing a cerium compound.

The salt may be chosen such that a selected chemical element is present in the dispersible product.

6 Claims, No Drawings

PROCESS FOR THE PREPARATION OF A DISPERSABLE PRODUCT CONTAINING A CERIUM COMPOUND IN ASSOCIATION WITH A SELECTED METAL

This application is a continuation of application Ser. No. 589,743 filed Mar. 15, 1984, now abandoned, which is continuation of Ser. No. 402,248 filed July 27, 1982 now abanodoned.

The present invention relates to compounds and more particularly to cerium compounds and cerium compounds in association with other elements.

According to one aspect of the present invention there is provided a process for the preparation of a dispersible product containing a cerium compound which comprises heating a cerium (IV) oxide hydrate in the presence of a salt to cause deaggregation of aggregated crystallites in the cerium (IV) oxide hydrate and produce a dispersible product containing a cerium compound.

In accordance with one embodiment of the present invention there is provided a process for the preparation of a dispersible product containing a cerium compound which comprises heating a substantially dry cerium (IV) oxide hydrate in the presence of a salt to cause deaggregation of aggregated crystallites in the cerium (IV) oxide hydrate and produce a dry dispersible product containing a cerium compound.

It is to be understood that the concentration of salt used and the temperature and time of heating is such that the desired degree of deaggregation is effected. The concentration, temperature and time can be determined by experimentation for a particular cerium (IV) oxide hydrate starting material.

By "dispersible product" as used in this Specification it is meant that the dispersible product is dispersible in aqueous media (e.g. water or aqueous acid solutions) to give a colloidal dispersion (i.e. a sol). The dry dispersible product may, of course, still contain "structural" water.

The salt may be, for example, a metal salt such as a metal nitrate, metal chloride or metal perchlorate. Other salts, for example ammonium nitrate, may also be used in accordance with the present invention.

The salt may be chosen such that a selected chemical element is present in the dispersible product.

Thus, according to another aspect the invention further provides a process for the preparation of a dispersible product containing a cerium compound in association with a selected element which comprises heating a cerium (IV) oxide hydrate in the presence of a salt of the element to cause deaggregation of aggregated crystallites in the cerium (IV) oxide hydrate and produce a dispersible product containing a cerium compound in association with the element.

The dispersible product prepared in accordance with the immediately foregoing aspect of the present invention may comprise, for example, a mixture of a cerium compound and a compound of the element, of a mixture of a cerium compound with which ions of the element are associated (e.g. by being sorbed and thereby taken up by the cerium compound).

By way of example dispersible products containing yttrium or a rare earth element may be prepared by heating cerium (IV) oxide hydrate in the presence of an yttrium salt or rare earth element salt (e.g. $M(NO_3)_3$ where M is yttrium or a rare earth element).

Mixed colloidal dispersions of ceria-$M_2O_3$ have been prepared in accordance with the present invention at concentrations of up to $14^W/o M_2O_3$ where M is as defined above.

The present invention enables mixed colloidal dispersions to be prepared which are difficult or impossible to prepare by other routes such as adding $M(NO_3)_3$ salts to ceria sols, or by mixing $M(NO_3)_3$ with $Ce(NO_3)_3$ and then processing by aqueous routes to cerium (IV) sols containing added $M_2O_3$.

The mechanisms by which a salt effects deaggregation is not fully understood. However, it is believed that the salt gives rise to ionic species which interact with the crystallites (possibly in conjunction with water in the oxide hydrate) to effect the deaggregation.

More than one selected chemical element may be arranged to be present in the dispersible product if desired. Thus, optionally, a cerium (IV) oxide hydrate may be heated in the presence of a plurality of salts of selected elements to produce a dispersible product containing a cerium compound in association with the elements.

The present invention may also be used to prepare a dispersible product containing a selected element (e.g. silicon) which does not form a salt convenient for use in accordance with the present invention.

Thus, in accordance with a further aspect the present invention provides a process for the preparation of a dispersible product containing a cerium compound in association with a selected element which comprises heating a cerium (IV) oxide hydrate in the presence of the selected element and a salt of a further element to cause deaggregation of aggregated crystallites in the cerium (IV) oxide hydrate.

The salt of the further element may be, for example, a nitrate or a chloride (e.g. ammonium chloride).

The selected element may be provided in any suitable form such as a heat stable oxide powder (e.g. silica produced by a vapour phase condensation method such as flame hydrolysis).

Thus, by way of example, cerium (IV) oxide hydrate can be heated in the presence of silica produced by a vapour phase condensation method and a salt of a further element to give a dispersible product.

A mixed colloidal dispersion may also be formed by dispersing a dispersible product prepared in accordance with the present invention in a sol (e.g. a $SiO_2$ sol) or dispersing the dispersible product in water to form a sol and mixing this with another sol.

Cerium (IV) oxide hydrate for treatment in accordance with the present invention can be obtained commercially or, alternatively, can be prepared by any suitable route. For example, it can be prepared from readily available cerium salts, (e.g. of "reagent grade"). The preparation may be by precipitation from a cerium salt.

Thus, for example, as disclosed in British Patent Application No. 22835/78 (now BP No. 1603794) (UKAEA) (to which West German Offenlegungsschrift No. 2857146 corresponds), high purity cerous carbonate can be dissolved in aqueous nitric or hydrochloric acid to give a neutral solution and then oxidised with $NH_4OH/H_2O_2$ to give cerium (IV) oxide hydrate.

By way of further example cerium (IV) oxide hydrate for treatment in accordance with the present invention may be prepared by the conventional routes disclosed at page 1 lines 40 to 61 of B.P. No. 1342893 (UKAEA).

The degree of hydration of the cerium (IV) oxide hydrate starting material may vary over a wide range.

By way of example, dry dispersible products have been prepared in accordance with the present invention from cerium (IV) oxide hydrate starting materials having respectively 8% water and 60% water. Also by way of example, dispersible products have been prepared from oxide hydrate starting materials having other water contents.

Where, in accordance with the present invention substantially dry cerium (IV) oxide hydrate is heated in the presence of a salt, it is preferred that the temperature of heating of the cerium (IV) oxide hydrate is in the range 200°–450° C. and it has been found that heating in the range of 300°–350° C. is particularly useful in producing a dry dispersible product which can be dispersed to give highly concentrated sols (e.g. $>600 \text{ gl}^{-1}$ (3.5M in Ce(IV)).

A time of $\sim 1$ to 2 hours has been found to be suitable for heating substantially dry cerium (IV) oxide hydrate in the range of 200° C. to 450° C. to effect deaggregation in accordance with the present invention.

Preferably the nitrate/$CeO_2$ ratio in the dry dispersible product is in the range 0.05 to 0.25 and a particularly preferred range is 0.08–0.15.

The cerium (IV) oxide hydrate starting material typically can consist of insoluble particles of up to $\sim 2000$ Å diameter (i.e. greater than colloidal dimensions), the particles comprising aggregates of crystallites.

Colloidal dispersions prepared from dispersible products prepared in accordance with the present invention show, for example, a 10 to 20-fold reduction in this size in that such dispersions include colloidal size particles comprising individual crystallites ($\sim 50$ Å) and small aggregates of crystallites of say $\sim 100$ Å.

Thus, the heating in the presence of a salt in accordance with the present invention achieves deaggregation of the crystallites to enable particles of colloidal dimensions to be obtained.

Deaggregation in accordance with the present invention can involve breaking of bonds between crystallites in an aggregate of crystallites or a weakening of bonds or attractive forces between crystallites in an aggregate of crystallites to a degree that the crystallites can separate when the dispersible product is introduced into an aqueous medium.

A dispersible product prepared in accordance with the present invention may be used in the preparation of a colloidal dispersion (i.e. a sol).

Thus the present invention also provides a process for the preparation of a colloidal dispersion containing a cerium compound which comprises dispersing in an aqueous medium a dispersible product containing a cerium compound prepared to accordance with the present invention.

The invention further provides a process for the preparation of a mixed sol containing a cerium compound in association with a selected element comprising dispersing in an aqueous medium a dispersible product containing a cerium compound in association with a selected element prepared in accordance with the invention.

The invention further provides a process for the preparation of a gel which comprises drying a sol which has been prepared by dispersing in an aqueous medium a dispersible product containing a cerium compound prepared in accordance with the present invention.

The invention further provides a process for the preparation of a gel comprising drying a sol which has been prepared by dispersing in an aqueous medium a dispersible product containing a cerium compound in association with a selected element prepared in accordance with the invention.

The aqueous medium in which the dispersible product is dispersed can be water or aqueous acid solutions (e.g. dilute solutions of nitric acid). Gels may be produced by evaporating the sols at room temperature ($\sim 23°$ C.) or at elevated temperature ($\sim 50°$ C.). The gels are glassy and may be redispersed in water.

The invention further provides a process which comprises mixing a dispersible product prepared in accordance with the present invention with water at such a concentration that coagulation occurs to form a slurry and separating the solids of the slurry from liquor of the slurry.

The separated solids may be dispersed in water to form a colloidal dispersion.

It is understood that ionic species can be removed with the liquor such that the ionic concentration in the solids is less than in the dispersible product as initially formed. In this way, if desired, the concentration of ionic species which may interfere with the formation of a colloidal dispersion is reduced and a more concentrated colloidal dispersion may be formed on admixing the separated solids with water.

It will be appreciated that where a dispersible product prepared by heating in accordance with the present invention does not have concentration of ionic species which prevents a desired concentration of sol being formed, there is no necessity for carrying out the further steps of coagulation to form a slurry, separation and dispersion to reduce the concentration of ionic species.

According to another aspect the present invention provides a sol prepared by a process in accordance with the present invention.

According to a further aspect the present invention provides a gel prepared by a process in accordance with the present invention.

According to yet a further aspect the present invention provides a dispersible product prepared by a process in accordance with the invention.

British Patent Application No. 22835/78 (UKAEA) (British Pat. No. 1603794) (to which West German Offenlegungsschrift No. 2857146 corresponds) discloses inter alia:

"A process for the preparation of an aqueous dispersion of ceria which comprises forming a slurry of cerium (IV) hydroxide with water and an acid, the acid being capable of causing deaggregation of aggregated crystallites in the cerium (IV) hydroxide, heating the slurry for such a time that the pH reaches a steady value, the quantity of acid in the slurry being such that the said steady value of pH is below 5.4, thereby to produce a conditioned slurry and admixing water with the conditioned slurry to produce an aqueous dispersion of cerium".

British Patent Application No. 22835/78 (British Pat. No. 1603794) also discloses (page 6 lines 1 to 3) that certain cerium (IV) hydroxides are not easily susceptible to deaggregation in accordance with the invention disclosed therein and additionally the following passage appears at page 6 line 18 to page 7 line 2:

"Furthermore, to facilitate deaggregation as hereinbefore disclosed we believe that it is preferable that the starting cerium (IV) hydroxide should not have been heated to cause any substantial irreversible loss of water (e.g. heating to $>100°$ C.) prior to treatment in accordance with the present invention. For example we have found that a starting cerium (IV) hydroxide having 25% by weight water can be deaggregated in accordance with the present invention whereas some samples with 10% weight water content were not easily amenable to deaggregation.

Also we believe that the time and temperature and humidity of any prior heat treatment of the starting cerium (IV) hydroxide may affect the susceptibility of the cerium (IV) hydroxide of deaggregation in accordance with the present invention".

Thus, British Patent Application No. 22835/78 (British Pat. No. 1603794) indicates that it is undesirable to heat cerium (IV) hydroxide to an extent which causes any substantial irreversible loss of water if it is desired to effect deaggregation to give a dispersible product.

It is surprising therefore that, in accordance with one embodiment of the present invention, a dispersible product containing a cerium compound which is readily dispersible in aqueous media to give concentrated sols may be prepared by a process which includes heating substantially dry cerium (IV) oxide hydrate to give a dry dispersible product.

British Patent Application No. 8112046, now U.K. Pat. No. 2075478B discloses inter alia:

"A process for the preparation of a dispersible cerium compound which comprises heating a substantially dry cerium (IV) oxide hydrate in the presence of a deaggregating agent to cause deaggregation of aggregated crystallites in the cerium (IV) oxide hydrate and produce a dry dispersible cerium compound".

In accordance with Application No. 8112046, now U.K. Pat. No. 2075478B preferably the deaggregating agent comprises acid species.

As hereinbefore disclosed, cerium (IV) oxide hydrate for treatment in accordance with the present invention can be obtained commercially or, alternatively, can be prepared by any suitable route.

Thus, a salt may, for example, be added to previously prepared cerium (IV) oxide hydrate prior to heating in accordance with the present invention.

By way of futher example, cerium (IV) oxide hydrate, optionally, may be co-precipitated with a salt, or a precursor therefor, prior to being heated to effect deaggregation. Thus the salt, optionally, may be formed in situ during formation of the cerium (IV) oxide hydrate rather than being added to previously prepared cerium (IV) oxide hydrate.

For example, cerium (IV) oxide hydrate may be precipitated from a cerous salt solution in the presence of a salt of an element to form a mixture of cerium (IV) oxide hydrate and the salt of the element. Where a mixture contains cerium (IV) oxide hydrate and precursor for the salt the mixture may be treated after formation to form the salt. Thus, for example, the mixture may contain cerium (IV) oxide hydrate and the hydroxide of another element which may be converted to a salt prior to heating to effect deaggregation (e.g. nitric acid may be used to give a nitrate of the element).

Gels prepared by a process in accordance with the present invention may be heated to form ceramic materials.

The invention will now be further described, by way of example only, as follows:

EXAMPLE 1

700g of a 99.5% pure cerium IV hydrate (71.4% oxide) was stirred with 0.1341 of a yttrium nitrate solution containing 55.6 g of $Y_2O_3$ to give a mixture with the nominal composition of 10 w/o $Y_2O_3$-90 w/o $CeO_2$. The mixture was dried at 105° C. for 3 hours to yield a dry product containing total oxide: 77.6 w/o and $NO_3$, 18.2 w/o with a $NO_3/Y_2O_3+CeO_2$ mole ratio=0.67. A portion of the dry product (140 g) was heated in air at 320° C. for 4.5 hours using a bed-depth of 2.0 cm and yielded 114 g of dispersible product containing oxide, 94.0 w/o and $NO_3^-$, 5.6 w/o with a $NO_3^-/Y_2O_3+CeO_2$ mole ratio=0.17.

EXAMPLE 2

A sol was prepared from the dispersible product prepared in accordance with Example 1. Thus the the dispersible product prepared in Example 1 readily dispersed in water to form a 10 w/o $Y_2O_3-CeO_2$ sol containing 200 $gl^{-1}$ of $Y_2O_3+CeO_2$ with a pH of 4.7 and conductivity of 5.9 mmhos (22° C.).

EXAMPLE 3

107 g of a 99.5% pure cerium IV hydrate (93.2 w/o oxide) was mixed with 0.0481 of a yttrium chloride solution containing the equivalent of 11.1 g $Y_2O_3$ to give a nominal composition of 10 w/o $Y_2O_3$-90 w/o $CeO_2$. The mixture was dried at 105° C. for 18 hours to give 13 g of a dry product containing: $Y_2O_3+CeO_2$, 83.6 w/o and $Cl^-$, 7.1% with a $Cl^-/Y_2O_3+CeO_2$ mole ratio of 0.42. The dry product was heated in air at 300°-320° C. for between 0.5 and 1.0 hours to give a dispersible product containing: 94.7 w/o oxide and 6.2% $Cl^-$. The dispersible product was dispersed in water to give a dilute sol.

EXAMPLE 4

Dispersible product prepared in accordance with Example 3 was dispersed in water in high concentration (100 g $1^{-1}$) to cause coagulation to form a slurry. The slurry was heated to 90° C. and centrifuged to give a clear superantant liquor containing 0.38M chloride. The solids of the slurry were readily dispersed in water to give a sol $\geq 200$ g $1^{-1}$ in oxide with a pH of 3.9 and a conductivity of 8.6 mmhos. The $Cl^-$/oxide mole ratio in the sol was 0.13.

EXAMPLE 5

107 g of a 99.9% pure cerium IV hydrate (93.2% oxide) was mixed with an aqueous solution of ammonium chloride (75 ml) containing 7.7 g of $NH_4Cl$ to give a $Cl^-/CeO_2$ mole ratio of 0.25. The resulting mixture was dried at 105° C. for 18 hours and then heated in air at 300° C. for 0-5 hours (bed depth 2.0 cm) to give a dispersible product containing: oxide 94.0 w/o and $Cl^-$, 4.5 w/o with a $Cl^-/CeO_2$ mole ratio of 0.23. This dispersible product was dispersed in water to give a sol containing 100 $gl^{-1}$.

EXAMPLE 6

Dispersible product prepared in accordance with Example 5 was dispersed in water at high concentration (100 g $1^{-1}$) and heated at 90° C. to cause coagulation to give a slurry. The slurry was centrifuged to give a clear supernatant liquor was discarded. The solids of the slurry were readily dispersed in water to a sol having an oxide concentration $\geq 200$ g $l^{-1}$ with a pH of 1.7 and a conductivity of 14.0 mmhos (22° C.).

EXAMPLE 7

107 g of a 99.9% pure cerium IV hydrate (93.2 w/o oxide) was mixed with 75 ml of an ammonium nitrate solution containing 11.5 g of $NH_4NO_3$ ($NO_3^-/CeO_2$ mole ratio=0.23). The resulting mixture was dried at 105° C. and then heat treated at 300° C. for 0.5 hour to give a dispersible product containing: oxide, 93.8 w/o and nitrate, 4.8 w/o with a $NO_3^-/CeO_2$ mole ratio=0.14.

This dispersible product was dispersed in water to give a dilute sol ($\leq 100$ g $l^{-1}$).

EXAMPLE 8

Dispersible product prepared in accordance with Example 7 (i.e. $\geq 100$ g $l^{-1}$) to cause coagulation to form a slurry. The slurry was centrifuged, the supernatant liquor discarded and the solid dispersed in water to give a sol of high concentration ($\geq 200$ g $l^{-1}$).

EXAMPLE 9

50 g of 99.5% pure cerium (IV) oxide hydrate were mixed with 21 ml of 2M yttrium perchlorate solution (4.79 g $Y_2O_3$ equivalent—giving $\sim 10$ wt % yttrium oxide/total oxide) and the resulting mixture heated in air at 320° C. for 30 minutes to give a dispersible product.

EXAMPLE 10

0.039 l of yttrium nitrate solution containing the equivalent of 251 g.$l^{-1}$ $Y_2O_3$ was added to 0.248 l of a cerous nitrate solution containing the equivalent of 361 g $l^{-1}$ cerium oxide. To the mixture so formed (which contained the equivalent of 9.8 g of $Y_2O_3$ and the equivalent of 89 g $CeO_2$) 025 l of a europium nitrate solution containing the equivalent of 39 g.$l^{-1}$ of $Eu_2O_3$ was added and the whole diluted to 1 litre with water to give a mixed metal nitrate solution.

Whilst stirring a mixture containing 0.037 l of 100 volume $H_2O_2$ and 0.115 l of 18M $NH_4OH$ made to 0.2 l with water was added to the mixed metal nitrate solution. A precipitate formed and this was stirred for 15 minutes after which it was centrifuged. The residue was washed with two successive 1 l volumes of water to remove entrained salts.

The resulting washed residue was stirred with 0.04 l of 2.5M $HNO_3$, dried at 105° C. for 3 hours, and subsequently heated at 320° C. for 4 hours.

The resulting dispersible product was completely dispersible in water, contained 91.2 wt % oxide and had a nitrate:oxide mole ratio of 0.23.

I claim:

1. A process for the preparation of a dry dispersible product containing ceria and at least one metal oxide, dispersible in an aqueous media to give a mixed metal oxide colloidal dispersion of said ceria and at least 10 weight percent metal oxide comprising adding an aqueous solution of a metal salt selected from the group consisting of yttrium salt and rare earth metal nitrate, chloride or perchlorate to dry cerium IV oxide hydrate and heating the resulting mixture at a temperature of 200° C. to 450° C. for a time sufficient to effect deaggregation of aggregated crystallites in said cerium oxide hydrate and provide said dry dispersible product.

2. A process as claimed in claim 1 wherein a cerium (IV) oxide hydrate is heated in the presence of a plurality of salts.

3. A process as claimed in claim 1 wherein dry cerium (IV) oxide hydrate is heated in the presence of said salt at a temperature in the range 200° C. to 450° C.

4. A process for the preparation of a colloidal dispersion containing a cerium compound which comprises dispersing in an aqueous medium a dispersible product containing a cerium compound prepared by a process as claimed in claim 1.

5. A process for the preparation of a gel which comprises drying a sol which has been prepared by dispersing in an aqueous medium a dispersible product containing a cerium compound prepared by a process as claimed in claim 1.

6. A process for the preparation of a colloidal dispersion containing a cerium compound which comprises mixing a dispersible product prepared by a process as claimed in claim 1 with water at such a concentration that coagulation occurs to form a slurry, separating the solids of the slurry from liquor of the slurry and dispersing the separated solids in water to form a colloidal dispersion.

* * * * *